United States Patent

Nehl

[11] Patent Number: 4,847,738
[45] Date of Patent: Jul. 11, 1989

[54] STORAGE CONTAINER WITH DRAWER ELEMENT

[75] Inventor: Wolfgang Nehl, Waldachtal, Fed. Rep. of Germany

[73] Assignee: fischerwerke Arthur Fischer GmbH & Co KG, Waldachtal, Fed. Rep. of Germany

[21] Appl. No.: 176,024

[22] Filed: Mar. 30, 1988

[30] Foreign Application Priority Data

Apr. 13, 1987 [DE] Fed. Rep. of Germany ....... 3712530

[51] Int. Cl.⁴ .............................................. F21L 1/00
[52] U.S. Cl. .................................. 362/200; 362/183; 362/190; 362/155
[58] Field of Search .................. 362/61, 80, 183, 190, 362/191, 200, 288, 132, 802, 276, 155, 156

[56] References Cited

U.S. PATENT DOCUMENTS 4,327,401  4/1982  Silberg ................................ 362/191

FOREIGN PATENT DOCUMENTS 394755  7/1933  United Kingdom .................. 362/61

Primary Examiner—Ira S. Lazarus
Assistant Examiner—Sue Hagarman
Attorney, Agent, or Firm—Michael J. Striker

[57] ABSTRACT

A storage container comprises a housing, and a drawer element which is movable between an inserted position and a withdrawn position relative to the housing, the drawer element being formed as a removable lamp which at least in the inserted position is electrically connected with a current source.

12 Claims, 2 Drawing Sheets

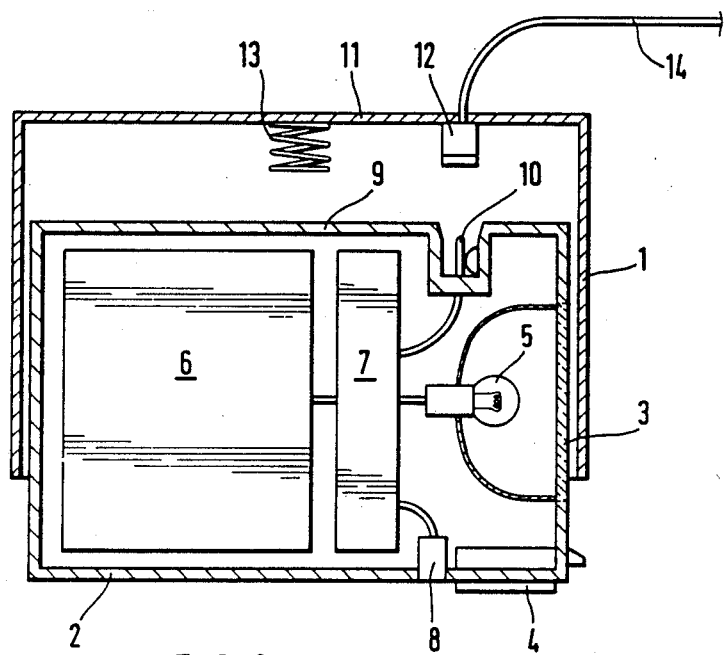
FIG.3
FIG.4
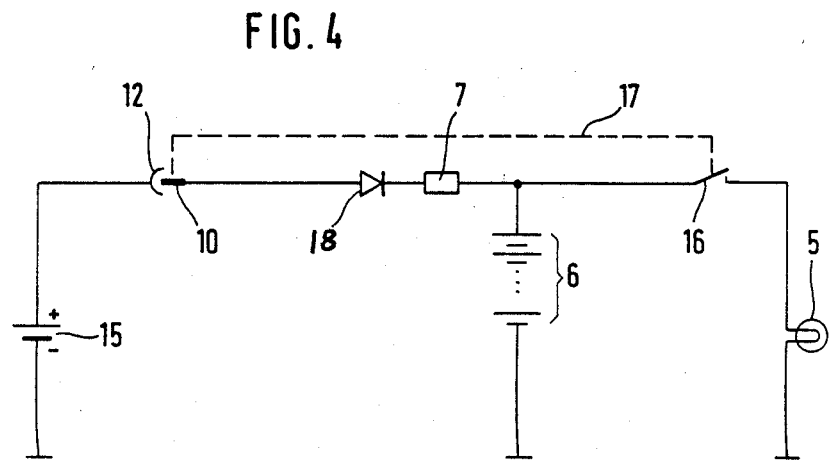

STORAGE CONTAINER WITH DRAWER ELEMENT

BACKGROUND OF THE INVENTION

The present invention relates to a storage container with a drawer element. More particularly, it relates to a storage container with a drawer element which is displaceable against a spring force of a spring in the housing of the storage container and is lockable there, for the use in vehicles.

Storage containers for storing recording tape cassettes and other sound carriers are known, in which drawer elements are insertable against a spring force. In the inserted position the drawer elements are locked, and unlocking can be performed by pressing a key. The spring which is associated with each drawer element presses the drawer element to an abutment, so that in this position for example one recording tape cassette located in the drawer element can be withdrawn.

SUMMARY OF THE INVENTION

Accordingly, it is an object of the present invention to provide a storage container of the abovementioned general type, which is formed so that it can receive a conveniently removable lamp.

In keeping with these objects and with others which will become apparent hereinafter, one feature of the present invention resides, briefly stated, in a storage container in which the drawer element is formed as a removable lamp which at least in its inserted position is electrically connected with a current source.

In accordance with another feature of the present invention, vehicle batteries can serve as the current source. The electrical connection with the current source insures that the removable lamp is always ready for use.

The lamp can be connected with the vehicle battery through an automatically rolling cable, or advantageously supplied with power from an accumulator which is arranged in the drawer element. The accumulator in the inserted position of the drawer element is electrically connected through a plug connection with the vehicle battery, so that in this position the accumulator can be charged with full voltage. The plug connection can be formed by a plug and a respective socket arranged on the drawer element and in the interior of the housing of the storage container.

In accordance with a further modification of the invention, the lamp is automatically switched on during removal of the drawer element. When the storage container is formed with this feature, an additional required on-off switch can be dispensed with.

Since the lamp is to be completely withdrawn from the storage container, it is advantageous to use a spring with a small stroke, so that the drawer element in the unlocked position is not completely pressed outwardly of the storage container. The spring stroke, however, must be so long that the unlocked drawer is displaced to a withdrawal position in which the drawer element can be conveniently engaged.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing a section of the storage container in accordance with a further embodiment of the invention, with a removable lamp; and FIG. 4 is a view showing an electrical circuit for a lamp operating with an accumulator.

DESCRIPTION OF THE PREFERRED EMBODIMENTS

Figure 1:
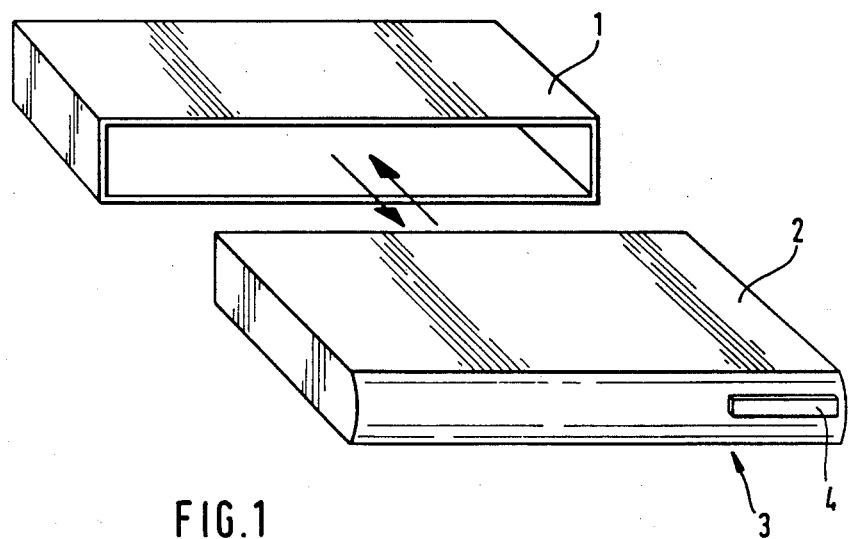
FIG. 1 is a view showing a storage container with a removed drawer formed as a lamp.

A storage container shown in FIG. 1 has a housing 1 and a drawer element 2 which is formed as a removable lamp provided with a light outlet opening 3 on its lower side. The drawer element 2 formed as a lamp has a button 4 for unlocking by application of pressure the drawer element completely inserted in the housing 1.

Figure 2:
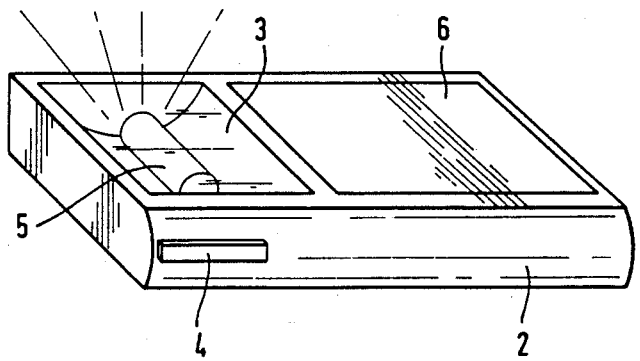
FIG. 2 is a view showing a lower side of the drawer element of FIG. 1 with a light outlet opening.

As can be seen from FIG. 2, an electric bulb 5 is arranged in the region of the light outlet opening 3 of the drawer element 2. The electric bulb 5 is supplied with power from an accumulator 6.

FIG. 3 shows the construction of the inventive storage container in a section. The light outlet opening 3 in this embodiment is provided on a small side of the drawer element 2. For this purpose the drawer element 2 can be made of a light-conductive material at least in the region of the light outlet opening 3. An accumulator 6, a charging resistance 7, a control light 8 and an electric bulb 5 are arranged in the drawer element 2 formed as removable manual lamp. A plug 10 is arranged on a rear side 9 of the drawer element 2 and is engageable in a socket 12 provided on a rear wall 11. The engagement is achieved when the drawer element 2 is completely inserted into the housing 1 against the force of a spring 13.

The spring 13 is dimensioned so that when the drawer element 2 formed as the manual lamp is unlocked by actuation of the bottom 4, the spring brings it approximately to the shown position, so that the manual lamp can be conveniently withdrawn from the housing 1. The spring 13 can have the length which is shown in the drawing and must have a respectively high spring force so as to press the plug 10 by the spring force out of the socket 12 after the unlocking. The socket 12 is connected through a cable 14 with a not shown vehicle battery.

FIG. 4 shows an electrical diagram of the storage container of FIG. 3, in which only the control lamp 8 is dispensed with since it is not necessary. The vehicle battery 15 is connected by its one pole with a mass, while its another pole is connected with the socket 12. The accumulator 6 is connected with the vehicle battery 15 through the plug 10, a protective diode 18 and the charging resistance 7. The electric bulb 5 is actuatable through a switch 16, which in a not shown position during removal of the hand lamp from the housing 1 is closed, so that the electric bulb 5 is supplied with power from the accumulator 6. A broken line 17 shows that the switch 16 is opened during insertion of the plug 10 into the socket 12.

The storage container with the removable lamp is suitable for removal especially in connection with further neighboring storage containers, the recording tape cassettes or the likes.

It will be understood that each of the elements described above, or two or more together, may also find a useful application in other types of constructions differing from the types described above.

While the invention has been illustrated and described as embodied in a storage container with a drawer element, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A storage container, comprising a housing; and a drawer element which is movable between an inserted position and a withdrawn position relative to said housing, said drawer element being formed as a removable lamp which at least in said inserted position is electrically connected with a current source; means for electrically connecting said lamp in said inserted position with the current source; and spring means arranged so that said drawer element is movable toward said inserted position against a spring force of said spring means and movable toward said withdrawn position under the action of the spring force of said spring means, said spring means being separate from said electrically connecting means.

2. A storage container as defined in claim 1; and further comprising spring means arranged so that said drawer element is movable toward said inserted position against a spring force of said spring.

3. A storage container as defined in claim 1; and further comprising a locking means arranged so that said rawer is locked in said housing in said inserted position.

4. A storage container as defined in claim 1, and further comprising a vehicle battery which forms the current source.

5. A storage container as defined in claim 1, wherein said drawer element is provided with an accumulator and means for connecting said accumulator with a current source in the inserted position of said drawer element.

6. A storage container as defined in claim 5, wherein said connecting means is formed as an electrical plug connection.

7. A storage container as defined in claim 6, wherein said drawer element has a rear side and said housing has a rear side, said plug connector including a plug provided on one of said rear sides and a socket provided on the other of said rear sides.

8. A storage container as defined in claim 7, wherein said plug is provided on the rear side of said drawer, while said socket is provided in the rear side of said housing.

9. A storage container as defined in claim 1, wherein said drawer formed as a lamp has a light source; and further comprising means for automatically switching on said light source in said withdrawn position of said drawer element.

10. A storage container as defined in claim 1, wherein said drawer has a predetermined depth, said spring means including a spring located in said housing and arranged to displace said drawer element to said withdrawn position, said spring having a spring stroke which is smaller than said depth of said drawer element.

11. A storage container, comprising a housing; and a drawer element which is movable between an inserted position and a withdrawn position relative to said housing, said drawer element being formed as a removable lamp which at least in said inserted position is electrically connected with a current source; locking means arranged so that said drawer is locked in said housing in said inserted position; means for electrically connecting said lamp in said inserted position with a vehicle battery which forms the current source; and spring means arranged so that said drawer element is movable toward said inserted position against a spring force of said spring means, and movable toward said withdrawn position under the action of the spring force of said spring means said spring means being separate from said electrically connecting means.

12. A storage container, comprising a housing; and a drawer element which is movable between an inserted position and a withdrawn position relative to said housing, said drawer element being formed as a removable lamp which has a light source and at least in said inserted position is electrically connected with a current source; locking means arranged so that said drawer is locked in said housing in said inserted position; spring means arranged so that said drawer element is movable toward said inserted position against a spring force of said spring; an accumulator which forms said current source; means for electrically connecting said accumulator with a current source in the inserted position of said drawer element; and means for automatically switching on said light source in said withdrawn position of said drawer element said spring means being separate electrically connecting means.

* * * * *